United States Patent
Kotlowski et al.

(10) Patent No.: US 7,576,771 B1
(45) Date of Patent: Aug. 18, 2009

(54) METHOD AND APPARATUS OF PROVIDING VIDEO SYNCHRONIZATION

(75) Inventors: Kenneth J. Kotlowski, Berthoud, CO (US); Daniel Daugherty, Loveland, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 613 days.

(21) Appl. No.: 11/075,303

(22) Filed: Mar. 8, 2005

(51) Int. Cl.
H04N 17/02 (2006.01)
H04N 5/21 (2006.01)
H04N 5/08 (2006.01)

(52) U.S. Cl. .................. 348/194; 348/616; 348/533; 348/525

(58) Field of Classification Search ............ 348/607, 348/194, 525, 533, 616, 180; 386/2, 47–51
See application file for complete search history.

(56) References Cited

U.S. PATENT DOCUMENTS

| | | | | |
|---|---|---|---|---|
| 4,360,825 A | * | 11/1982 | Srivastava | 348/506 |
| 4,792,852 A | * | 12/1988 | Narusawa | 348/530 |
| 4,792,853 A | * | 12/1988 | Yamagishi et al. | 348/526 |
| 4,796,243 A | * | 1/1989 | Kato | 386/91 |
| 5,045,950 A | * | 9/1991 | Iwamura et al. | 386/12 |
| 5,146,336 A | * | 9/1992 | Tessier et al. | 348/512 |
| 5,274,514 A | * | 12/1993 | Han | 360/73.13 |
| 5,532,837 A | * | 7/1996 | Ootaka et al. | 386/112 |
| 5,608,462 A | * | 3/1997 | Maas et al. | 348/531 |
| 5,892,593 A | * | 4/1999 | Kim | 358/497 |
| 5,946,443 A | * | 8/1999 | Oh | 386/46 |
| 6,029,208 A | * | 2/2000 | Kim | 710/4 |
| 6,222,590 B1 | * | 4/2001 | Makino | 348/547 |
| 6,636,269 B1 | * | 10/2003 | Baldwin | 348/500 |
| 6,982,765 B2 | * | 1/2006 | Testin et al. | 348/634 |
| 6,985,174 B1 | * | 1/2006 | Thompson et al. | 348/180 |
| 7,075,280 B2 | * | 7/2006 | May | 323/284 |
| 7,202,913 B2 | * | 4/2007 | Wang et al. | 348/570 |
| 2006/0104367 A1 | * | 5/2006 | Bruls et al. | 375/240.28 |

* cited by examiner

Primary Examiner—Victor R Kostak

(57) ABSTRACT

Video control signals are received at a video input port of a system. A determination is made whether the video control signals are valid or invalid. When video control signals represent a valid video signal, providing a delayed representation of a control signal to a synchronization input of a display engine of the system, and when the video control signals represent an invalid video signal, providing a an alternative signal to the synchronization input of the display engine.

18 Claims, 4 Drawing Sheets

METHOD AND APPARATUS OF PROVIDING VIDEO SYNCHRONIZATION

FIELD OF THE DISCLOSURE

The present disclosure relates to video images, and more particularly to the processing of video signals.

DESCRIPTION OF THE RELATED ART

For the typical viewer of video images, an uninterrupted image, without artifacts, is important to provide a satisfactory viewing experience. However, when a streaming video signal is changed or otherwise interrupted, artifacts, such as tearing or the blanking of images, can occur. The ability to reduce such artifacts would be useful.

BRIEF DESCRIPTION OF THE DRAWINGS

The purposes and advantages of the present invention will be apparent to those of ordinary skill in the art from the following detailed description in conjunction with the appended drawings in which like reference characters are used to indicate like elements, and in which.

DESCRIPTION OF THE PREFERRED EMBODIMENT(S)

Figure 1:
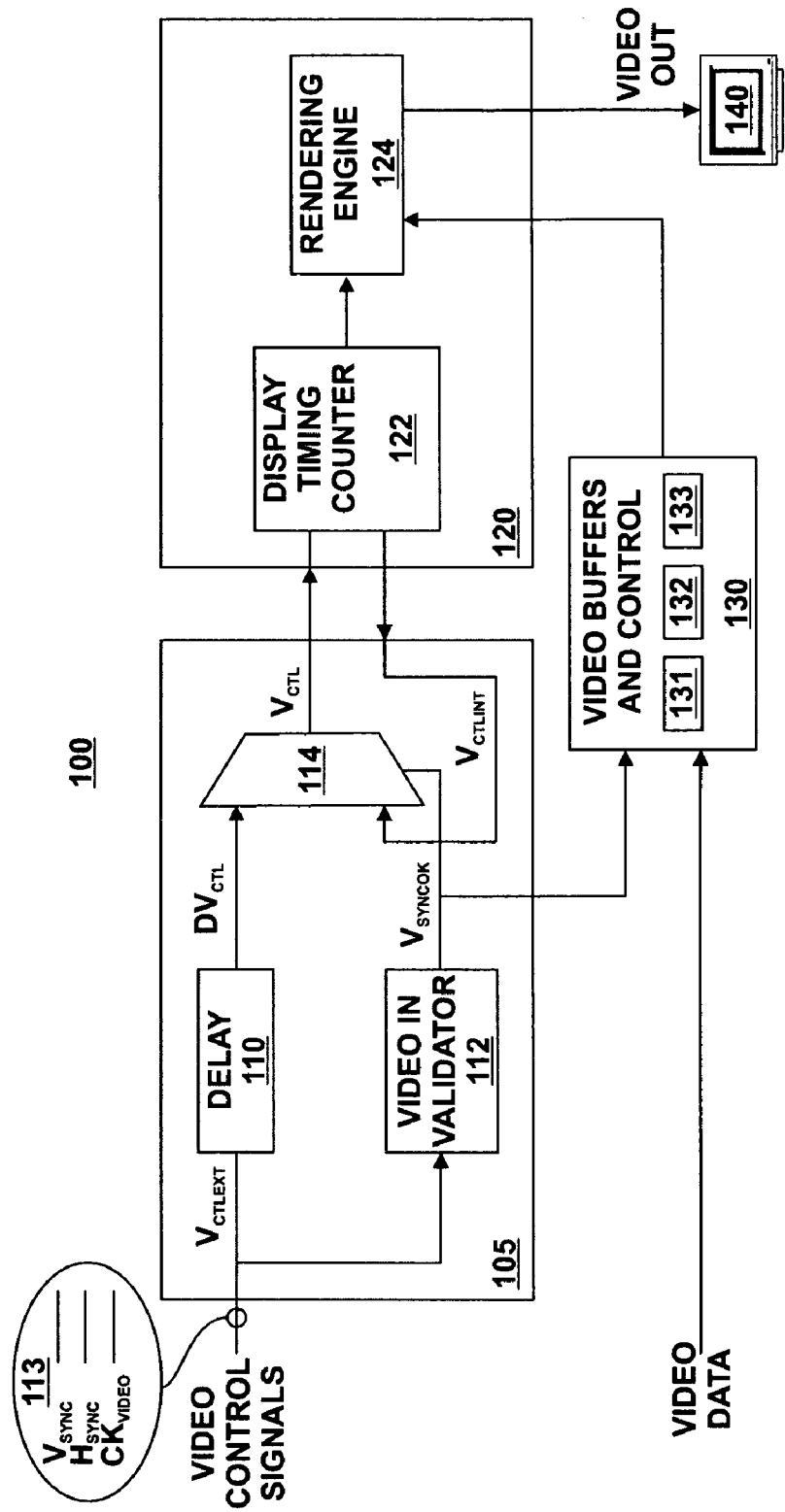
FIG. 1 illustrates, in block diagram form, a portion of a system for processing a video screen input in accordance with a specific embodiment of the present disclosure.

FIG. 1 illustrates a video subsystem that will typically be integrated onto a semiconductor substrate along with other functional components or blocks. Generally, the video subsystem of FIG. 1 receives a video signal that includes video control signals and video data. In the embodiment illustrated, the video signals provide digital video images and are received at a predetermined rate. Specifically illustrated as part of the VIDEO CONTROL SIGNALS are $V_{SYNC}$, $H_{SYNC}$, $CK_{VIDEO}$ in detail area 113, though it will be appreciated that different or other control signals may also be present.

It will be appreciated that, in operation, the starting point of a first frame of data in a received video stream is non-deterministic when the subsystem 100 has no knowledge of the video stream to be received. As a result of the non-deterministic nature of the video signal, if the source of the video changes, such as when a channel is changed, the frame rate can also change. Alternatively, an event up-stream from the subsystem of FIG. 1 can result in the video signal being lost entirely. The video subsystem 100 can detect an interruption of a signal that is used by the display engine for synchronizing, or otherwise displaying images, and generate an alternate signal to replace the interrupted signal in order to reduce the affects of such artifacts. In effect, the alternate synchronization signal allows a frame rate to be maintained during a transitional periods of time.

In accordance with a specific embodiment of the present disclosure, a variable delay element is inserted in a path between the video input port and the display engine so that control signals received at the video input port may be delayed. By delaying the video control signals, and specifically synchronization signals, the subsystem 100 can be provided enough time to determine whether the video signal being received remains valid prior to providing the signal to the display engine. For example, the subsystem 100 can determine whether a next expected, i.e. anticipated, synchronization signal is received within an expected period of time.

In one embodiment, when the video subsystem determines that a next expected synchronization signal did not arrive, an indicator that the current video stream is invalid is generated and an alternative signal will be provided to the display engine 120 to replace the expected synchronization signal. In a specific embodiment, a delay amount in the synchronization signal path is variable, and can be set sufficiently long to allow for the subsystem 100 to determine if an invalid video signal is being received, such as a missing synchronization pulse, and to provide an alternative signal. Such a delay path facilitates a transition from the expected signal to the alternate signal that provides the missing expected signal. In one embodiment the delay is based upon a system clock or a video clock, which can be a pixel clock.

For purposes of discussion, the delay described in the present disclosure will be discussed with reference to a delayed synchronization signal, e.g. a delayed video synchronization signal. It will be understood that video signals other than synchronization signals can be delayed in accordance with the present disclosure to detect valid and invalid video signals.

In one embodiment, the video control signal, i.e. a synchronization signal, can be delayed by a variable amount. This variable delay can be used to compensate for changes in the synchronization signal rate, such as can occur when changing channels. For example, different synchronization timing will typically occur when a new video stream replaces a previous video stream in a non-deterministic manner. By using a variable delay in the synchronization path, a timer can be adjusted so that the first occurrence of the new synchronization signal is provided to the display engine 100 at approximately the same time as the synchronization signal of the previous video signal, thereby reducing artifacts. The present disclosure will be better understood with reference to the specific embodiments illustrated in FIGS. 1-7.

FIG. 1 illustrates a specific embodiment of a video subsystem 100 for receiving video from an external source. Specifically illustrated are video control signals (VIDEO CONTROL SIGNALS), and video data (VIDEO DATA) being received at the video subsystem 100. The video control signals comprise a plurality of signals, that can include a vertical synchronization signal ($V_{SYNC}$), a horizontal synchronization signal ($H_{SYNC}$), a video clock ($CK_{VIDEO}$), and other signals that may be associated with the transmission of video signals, and especially video sent in digital formats.

Video subsystem 100 is illustrated to include a video control select module 105, a display engine 120, Video Buffers and Control 130, and display 140. Video control select module 105 comprises a first input port to receive a plurality of video control signals, and a second input port coupled to the display engine 120, a first output port coupled to the display engine 120, and a second output port coupled to the video buffers and 130. Display engine 120 comprises a first input port coupled to the first output port of the video control select module 105, and a first output port coupled to the second input port of the video control select module 105. The display engine 120 further comprises a second input port coupled to Video Buffers and Control 130, and a second output port coupled to the display device 140. The Video Buffers and Control 130 include a first input port coupled to receive video data, a second input port coupled to the video control select module 105, and a first output port coupled to the display engine 120.

The video control select module 105 further comprises a delay module 110, a Video In Validator 112, and Selector 114. The delay portion 110 comprises a first input coupled to receive video control signals ($V_{CTLEXT}$) received at the video control select module 105, and a first output to provide a delayed representation ($DV_{CTL}$) of the video control signals. Video In Validator 112 comprises an input coupled to receive video control signals from the video input port of the video control select module 105, and an output port to provide a signal to indicate when the video signal is OK ($V_{SYNCOK}$), i.e. whether the video signal is valid or invalid. Select portion 114 is illustrated to be a multiplexor and comprises a select input coupled to the output of the Video In Validator 112, a first data input coupled to the first output of the delay portion 110, and a second data input coupled to the display engine 120.

In operation, the video control signals are received at the delay portion 110 and at Video In Validator 112 of the video control select modules 105. The delay portion 110 provides a delayed representation of the video control signals labeled $DV_{CTL}$ to the first input port of the select portion 114. The Video In Validator 112 determines whether a received video is valid or invalid and asserts a signal labeled $V_{SYNCOK}$ to indicate whether a valid video signal is present or not, i.e. $V_{SYNCOK}$ signal is asserted for valid video or $V_{SYNCOK}$ signal negated for an invalid video.

Based upon the state of the $V_{SYNCOK}$ signal, either the $DV_{CTL}$ signal or the $V_{CTLINT}$ signal will be selected by the multiplexer 114. When valid video control signals are detected, a representation of the delayed signal, $DV_{CTL}$, is provided as the signal $V_{CTL}$, which is provided to the display engine 120 as signal $V_{CTL}$. When the valid video indicator $V_{SYNCOK}$ is negated, the alternate video control signals $V_{CTLINT}$ are selected and provided to the display engine 120 as signal $V_{CTL}$.

The signal labeled $V_{CTLINT}$, is an internally generated representation of one or more of the video control signals ($DV_{CTL}$) needed by the display engine 120 for operation. In one embodiment, the display engine can generate this alternate control signal so that it may be selected when the video signal is determined to be invalid. For example, the display engine 120 comprises a Display Timing Control 122. The Display Timing Control 122 monitors the one or more signals represented by $V_{CTL}$, and emulate these control signals. For example, during normal operations, with respect to a specific video synchronization signal, $V_{SYNC}$, Display Timing Control 122 would expect a $V_{SYNC}$ pulse to be repeated periodically in a predictable manner, such as after a predetermined number of clock cycles corresponding to a resolution of the image being displayed.

In accordance with one embodiment, Display Timing Control 122 determines a delay between received video synchronization indicator pulses and generates one or more internal control signals $V_{CTLINT}$ that emulate the received video synchronization indicator pulses. In this manner, one or more alternate control signals can be made are available, as part of $V_{CTLINT}$, should a received control signal become invalid. In a specific embodiment, the alternate video control signal $V_{CTLINT}$ is ignored during normal operation unless the Video In Validator 112 determines that the video control signals being received are no longer valid By allowing for an alternate control signal to replace an invalid control signal, it is possible for the display engine 122 to continue to render data for display without artifacts when a control signal is not valid. In one embodiment, a previously displayed image will continue to be displayed after the video signal is determined to be invalid. In order to assure that the a previously received frame is available, i.e. stored in video buffers or memory, the $V_{SYNCOK}$ signal can also be provided to the portion 130, which will use the valid indicator to assure a previous frame is not overridden and remains available to the rendering engine 124 to provide as rendered video to the video out port of the display engine 120 for display 140.

Figure 2:
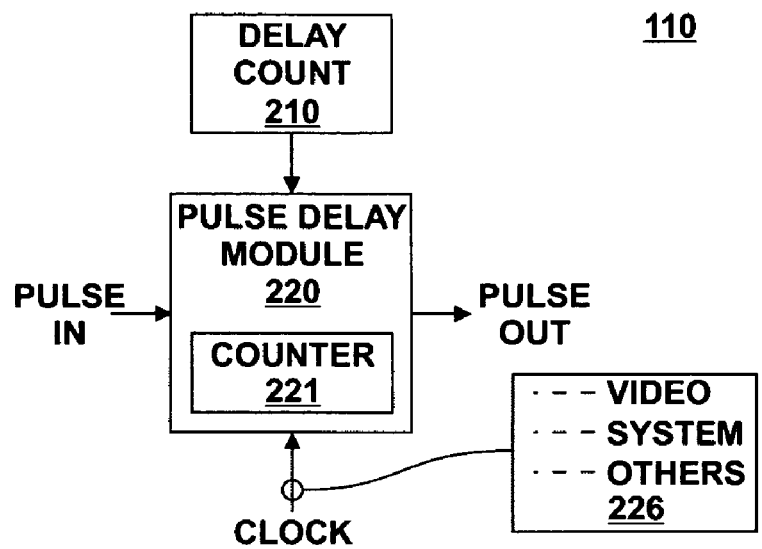
FIG. 2 illustrates, in block diagram form, a portion of FIG. 1 in greater detail in accordance to a specific embodiment.

FIG. 2 illustrates a specific implementation of the delay portion 10 in accordance with a specific embodiment of the disclosure. Specifically, FIG. 2 illustrates a storage location 210, such as a register, for storing a delay count, and a pulse delay module 220.

The Pulse Delay Module 220 is illustrated to include a counter 221 that is incremented by a clock signal, labeled CLOCK. Informational box 226 illustrates possible sources of the clock signal which can be a pulsed signal generated from a system clock of the subsystem 100 or from an specific application or device to which the video subsystem is a member, clock received and specifically associated with the video control signals, such as a pixel clock, or other video clock.

In operation, the storage location 210 will contain a value that represents a delay count corresponding to an amount of time by which video control signals are to be delayed delay element 110. For example, a synchronization pulse associated with a specific video signal can be delayed from when it is received, until the counter 221, which is reset upon receiving the pulse, is incremented to match or be greater than a delay count at location 210. In this way, the delayed signals $DV_{CTL}$ can be generated to represent a delayed version of the input signal.

Figure 3:
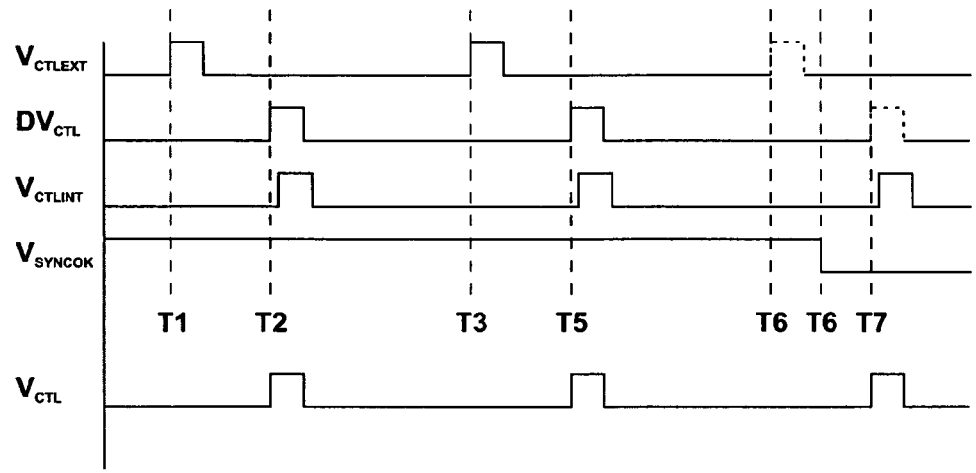
FIG. 3 illustrates, in timing diagram form, video signals associated with a specific embodiment of the system of FIG. 1.

FIG. 3 illustrates a timing diagram in accordance with a specific embodiment of the disclosure. For purposes of discussion with respect to FIG. 3, the timing signal $V_{CTLEXT}$ represents one of a possible plurality of video control signals received at the video input port of the video subsystem 100. The signal labeled $DV_{CTL}$ represents the delayed representation of the signal $V_{CTLEXT}$. The signal labeled $V_{CTLINT}$ represents the alternate video control signal generated internally by the display timing control portion 122. The signal $V_{SYNCOK}$ represents the video OK signal used to select between the delayed video representation of the external signals or the internally generated video control signals. Lastly, the signal labeled $V_{CTL}$ represents the synchronization/control signal that is provided to the timing display control 122 of the display engine 120.

The external video signal, $V_{CTLEXT}$, is illustrated as having three pulses, with the last pulse being represented by a dotted line. The pulse illustrated as a dotted line represents a pulse that is expected but is not received. T1 represents the time associated with the rising edge of the first pulse of signal $V_{CTLEXT}$. Time T3 represents the rising edge of the second pulse of signal $V_{CTLEXT}$. The time difference between T3 and T1, i.e. T3-T1, is the time period between expected pulses for the video signal being received. At time T5, a third pulse is expected.

Also illustrated in FIG. 3, is the delayed control signal $DV_{CTL}$, which is delayed from its corresponding signal $V_{CTLEXT}$ by an amount equal to T2-T1. Note that there is no pulse generated at time T7 as would be expected because there was no pulse received at time T5, from $V_{CTLEXT}$. The signal $V_{SYNCOK}$ remains asserted from time T1 until time T6. At time T6, the Video In Validator 112 portion of FIG. 1 has detected that a pulse of the video signal $V_{CTLEXT}$ has been missed. In response, the signal $V_{SYNCOK}$ has been negated. In a specific embodiment, the Video In Validator 112 contains logic that would expect to see a pulse, or a rising edge associated with a signal within a specific time range. For example, Video In Validator 112 can monitor clock counts between valid pulses to determine when a next valid count is expected. When an expected signal is not received at this count, or within a range of counts, the Video In Validator 112 will negate the $V_{SYNCOK}$ signal to indicate that the external video source is no longer valid. As a result of negating the $V_{SYNCOK}$ signal, an alternate clock source is selected at the multiplexer 114 of FIG. 1, which is the $V_{CTLINT}$ signal generated by the display engine 120. It will be appreciated that the video signal can be determined to be invalid based upon various criteria. In addition to a missing synchronization pulse, as described herein, a video signal can be determined to be invalid in response to other events, such as a synchronization pulse occurring too early or too late, a video clock $CK_{VIDEO}$ not toggling, or if the timing of other signals varies from an expected range.

The $V_{CTLINT}$ signal, which acts as an alternate clock, is generated by the display engine 120 to correspond with the expected delayed video control signal $DV_{CTL}$. By generating the signal $V_{CTLINT}$, which may be generated using counters or phase-locked-loop techniques, it is possible to have an alternate control signal ready to be substituted for $DV_{CTL}$ if the $V_{SYNCOK}$ signal is negated.

When the external video control signals are determined to be valid after being invalidated, it is likely that the newly validated video will not be synchronized to the previously lost signals. In other words, with respect to the signal $V_{CTLEXT}$ of FIG. 3, the location of the periodic pulses will not be likely to line up with the video control signals of the newly acquired video, nor will the periodic delay between pulses remain the same. This probable lack of synchronization is especially expected when the newly acquired video represents a different channel or source of video. This lack of synchronization can result in a visual artifact occurring on the image being displayed by the user. For example, if the $V_{SYNCOK}$ signal were to transition from being negated, whereby a predefined video image is displayed repeatedly, to being asserted, indicating that new frame are ready to be displayed, it would be possible for tearing to occur with respect to the image. An alternate implementation of delay element 110 that can be used to avoid such artifacts in accordance with a specific embodiment of the disclosure is illustrated with respect to FIG. 4.

Figure 4:
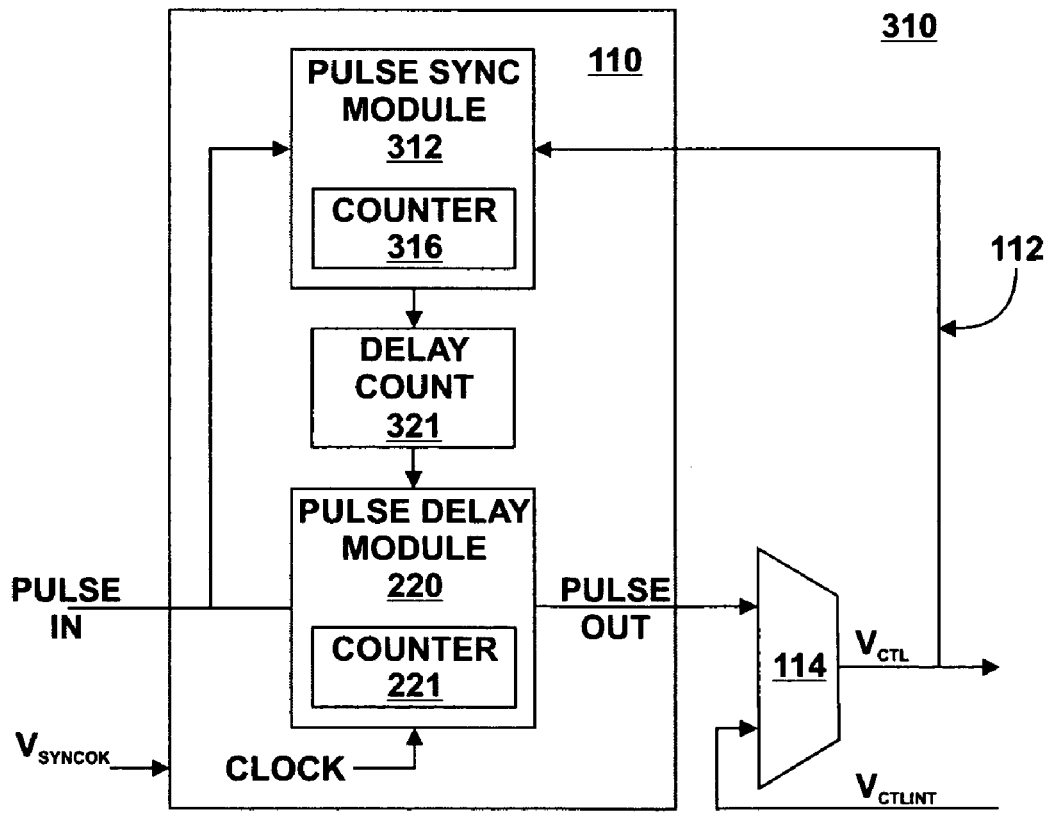
FIG. 4 illustrates, in block diagram form, an alternate embodiment of a portion of FIG. 1 in greater detail, in accordance with a specific embodiment.

FIG. 4 illustrates, in block diagram form, a delay module 110 that comprises a Pulse Delay Module 220, a Pulse Sync Module 312, and a delay count storage location 321. In addition, FIG. 4 illustrates for purposes of reference the select portion 114 of FIG. 1.

In operation, the Pulse Delay Module 220 and delay count storage location 221 operate in a similar manner as the pulse delay module and delay count storage location previously described with respect to FIG. 2. The Pulse Sync Module 312 receives the pulse in signal, which corresponds to one or more of the video control signals, and receives the video control signal $V_{CTL}$, which is provided to the display engine 120 from Selector 114. During normal operation, the pulse sync module 312 will monitor and confirm a fixed relationship between pulses received at the pulse-in input and pulses $V_{CTL}$ at the video control input. For example, these pulses will be typically be delayed by the delay count stored at 321 plus whatever additional propagation delay time occurs through the select portion 114. The pulse sync module 312 will determine when a pulse-in signal is no longer valid. This can be accomplished either by monitoring the pulse-in signal to determine if its being received at an expected periodic time, or by receiving a specific indication from the $V_{SYNCOK}$ signal. For purposes of discussion, it is assumed that the PULSE IN signal is determined to be invalid by the pulse sync module 220 when an expected pulse does not occur during an expected time.

Figure 5:
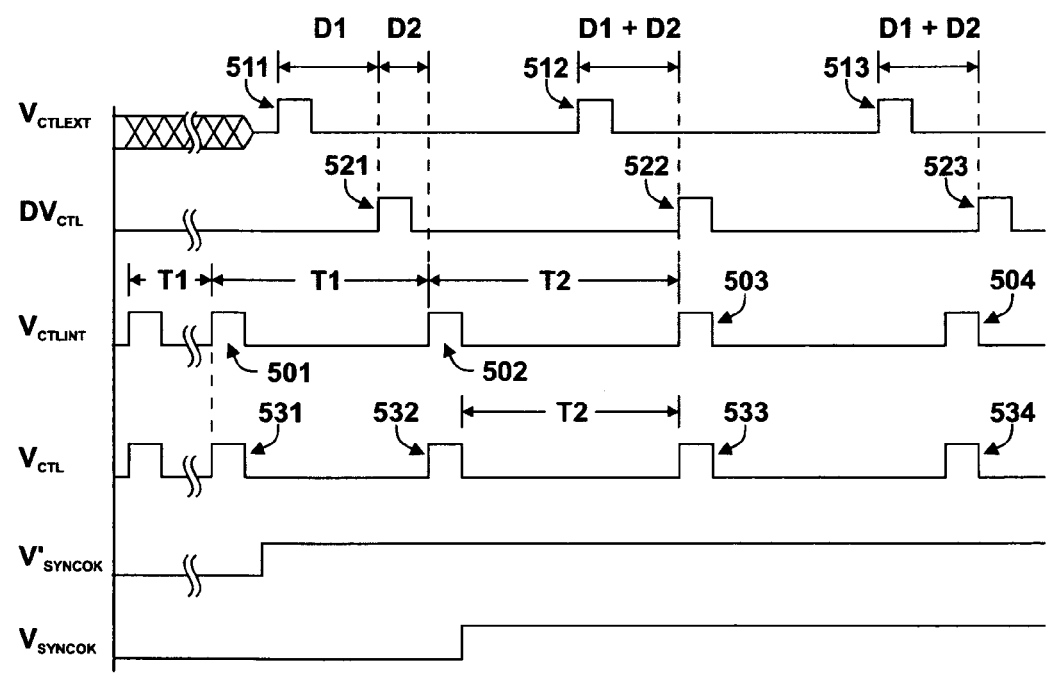
FIG. 5 illustrates, in timing diagram form, video signals associated with a specific embodiment of the system of FIG. 1.

The Pulse Sync Module 312 will continue to receive periodic pulses from the video control signal, $V_{CTL}$, even after the PULSE IN signal is no longer valid because periodic pulses will be provided from the alternate source, i.e. the display engine 120. In accordance with a specific embodiment, the alternate pulse will continue to be generated by the display engine 120 until the PULSE IN signal returns, and is validated. Once a new the PULSE IN signal is validated, the pulse sync module can detect an offset between the new PULSE IN signal and the video control signal $V_{CTL}$ being generated as an alternate to the previous video signal. Once detected, this offset can be compared to the expected delay count stored in storage location 321, which is the amount by which the previous video control signals are delayed. When it is determined by the Pulse Sync Module 312 that the discrepancy between the expected delay and the current delay will cause tearing, or is otherwise outside a predefined amount, the pulse sync module will provide a new delay count to the storage location 321. By providing the new delay count to storage location 321, the active edges of the synchronization pulses of the newly validated video can be substantially aligned with the pulses being generated by the display engine 120 and provided to the multiplexer $V_{CTLINT}$. Once the Video In Validator 112 determines that the video control signals being received are valid, and a new delay count has been stored in register 321 to align the new video with the previous video, tearing of images can be avoided. FIG. 5 illustrates a timing diagram indicating synchronization between two video signals.

FIG. 5 illustrates signals $V_{CTLEXT}$, $DV_{CTL}$, $V_{CTLINT}$, $V_{CTL}$, $V'_{SYNCOK}$, and $V_{SYNCOK}$. An initial portion of the timing diagram of FIG. 5 represents a period of time during which the $V_{SYNCOK}$ signal is negated, indicating that no valid video control signals are being received. During this period of time, the $V_{CTL}$ signal provided to the display engine 120 is based upon the signal $V_{CTLINT}$, which is generated internal to the subsystem 100.

Pulse 501 of signal $V_{CTLINT}$, and pulse 531 of $V_{CTL}$ video control signal represent the last pulses two pulses generated internally the display engine 120 prior to $V'_{SYNCOK}$ signal being asserted. Though not specifically illustrated, it will be appreciated, that the $V'_{SYNCOK}$ signal is asserted in response to valid video being detected at $V_{CTLEXT}$. In one embodiment, the pulse 511 of signal $V_{CTLEXT}$ represents the first video pulse subsequent to $V'_{SYNCOK}$ being asserted.

Subsequent to pulse 511 being received, a delayed pulse 521, which is part of signal $DV_{CTL}$, is generated based upon a value stored within the delay count storage location 321. Note that for purposes of illustration, it is assumed that the pulse sync module 312 has not determined a new delay count for storage location 321 at the time pulse 511 is generated. For example, with respect to FIG. 4, the module 110 can receive the $V'_{SYNCOK}$ signal to indicate that the pulse sync module should now determine a new delay count as appropriate.

To assure tearing of a displayed image does not occur, pulse 521, which is a delayed representation of pulse 511, should be synchronized with pulses of signal $V_{CTLINT}$, which has been providing timing to the $V_{CTL}$. One way to accomplish this is to increase or decrease the stored value by which controls the delay of pulse 521 is delayed from its parent pulse 511. Prior to receiving the new video signal, pulses are delayed by an amount D1. Based upon the newly validated external video signal $V_{CTLEXT}$, it is necessary to increase the delay amount by an additional time of D2 to provide a signal substantially coincident with the internally generated replacement pulse.

The pulse sync module 312 can determine a new delay count to be stored in storage location 321 by measuring the time from when the counter 321 indicates a pulse should occur, which is the end of time D1, until the beginning of the pulse currently being provided to the display engine 120, which is pulse 502. Subsequent to determining, and verifying a new delay count as appropriate, the pulse sync module 312 can provide an indicator, not shown, back to the Video In Validator 112, indicating that the $V_{SYNCOK}$ signal can now be asserted.

Once the Video In Validator 112 has been notified that a new delay value is ready, or when a sufficient amount of time has passed, the $V_{SYNCOK}$ signal can be asserted, whereby subsequent $V_{CTLEXT}$ pulses delayed by the new value stored in delay count 321, which provides for pulses delayed by a time D1+D2, are used to generate $V_{CTL}$, which is received at display engine 120 at a time substantially equal to when the next expected pulse, based upon the internally generated alternate pulse, was to be received. It will be appreciated that this avoids tearing, and other artifacts that can be associated with synchronization of varying video inputs.

Figure 6:
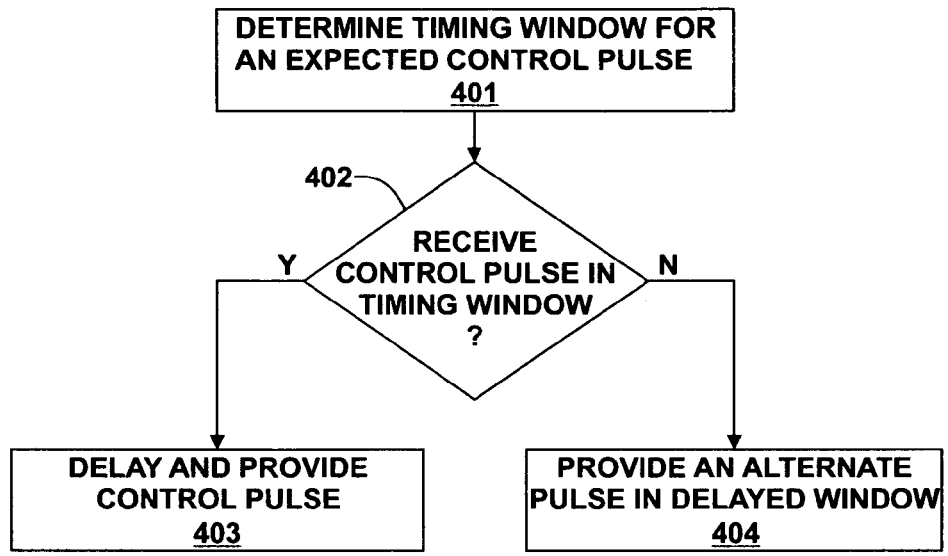
FIG. 6 illustrates, in flow diagram form, a method in accordance with a specific embodiment the present disclosure.

FIG. 6 illustrates, in flow diagram form, a method in accordance with the present disclosure. At step 401, a timing window is determined during which a control signal is to be received. The timing window can be based upon system clocks, pixel clocks, or other clocks or timers which may be available in a specific system.

At step 402, a determination is made whether a video control signal, such as a video synchronization signal, is successfully received during the timing window. For example, where the video control signal is a vertical synchronization pulse, a rising edge of the synchronization pulse may need to occur during the timing window for the video signal to be determined valid.

If the video control pulse is valid, flow proceeds to step 403 where a delayed representation of the valid control signal is provided to the display driver.

If the video control pulse is invalid, flow proceeds to step 404 where an alternate pulse is provided to the display driver in place of the missing pulse.

Figure 7:
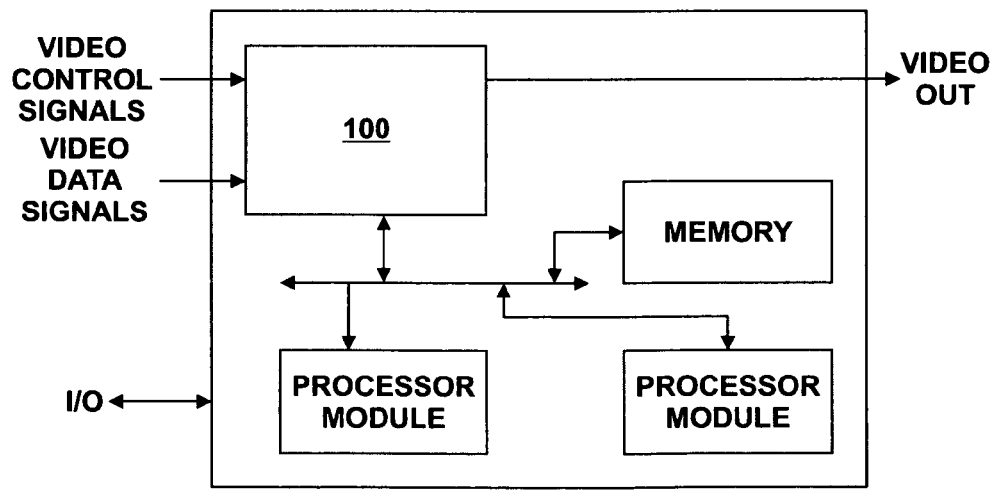
FIG. 7 illustrates, in block diagram form, a system level application utilizing the system portion 100 in accordance with a specific embodiment of the present disclosure.

FIG. 7 illustrates, in block diagram form, a system 700 comprising the video subsystem 100 in accordance with a specific embodiment of the present disclosure. The system 700 may be a system on a chip, integrated onto a common semiconductor substrate, a multichip module containing multiple components within a single package, or an application comprising one or more components on one or more substrates. The system 700 can be used to implement a specific application, such as a portable or desktop computing device. Additional Subsystem illustrated as part of FIG. 7 includes a processor module 710, a processor module 720, and memory 730. It will be appreciated that the processor modules 710 can comprise processors to application specific functions, as well as comprise general purpose processing devices that can execute instructions.

In the preceding detailed description, reference has been made to the accompanying drawings that form a part hereof, and in which are shown by way of illustration specific embodiments in which the invention may be practiced. These embodiments and certain variants thereof, have been described in sufficient detail to enable those skilled in the art to practice the invention. It is to be understood that other suitable embodiments may be utilized and that logical and electrical changes may be made without departing from the spirit or scope of the invention. In addition, it will be appreciated that the functional blocks shown in the figures could be further combined or divided in a number of manners without departing from the spirit or scope of the invention. For example, while a specific embodiment of verifying the video signal was described whereby the video control signals were monitored, it will be appreciated that the actual video data signal, or other sources, could be monitored to determine whether a valid video signal is obtained. For example, variations of the described technique can be applied to a wide range of video standards, such as digital video standards that do not provide specific $H_{SYNC}$ and $V_{SYNC}$ signal, but which instead embed the $H_{SYNC}$ and $V_{SYNC}$ information in the display data, whereby the $H_{SYNC}$ and $V_{SYNC}$ signals are derived from the video data. As a further example, the alternate timing signal $V_{CTLINT}$ of FIG. 1 is illustrated as generated within display engine 120, though it will be appreciated that the alternate timing signal can be generate from other portions of the subsystem 100 that have visibility to the video signal being received. For at least these reasons, the preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A method comprising the steps of:
   determining a video control signal received at a video subsystem of an integrated circuit is a valid video control signal in response to a transition of the video control signal from a first logic state to a second logic state occurring at a predetermined time range;
   determining the video control signal is an invalid video control signal in response to a transition of the video control signal from the first logic state to the second logic state not occurring at the predetermined time range;
   in response to determining a valid video control signal is received, providing a delayed representation of the video control signal to an input of a display engine, wherein the delayed representation represents the video control signal delayed by a first predetermined amount and comprises a first pulse edge provided to the display engine at a first time; and
   in response to determining an invalid video control signal is received, providing an alternate video control signal to the input of the display engine, the alternate video signal comprising a second pulse edge provided at approximately the first time.

2. The method of claim 1, wherein the first predetermined amount is based upon a predetermined number of video clock pulses associated with the valid video control signal.

3. The method of claim 2, wherein the predetermined number of video clock pulses is based upon a resolution of an image to be displayed.

4. The method of claim 2, wherein the alternate video control signal is generated based on information sent to the display engine.

5. The method of claim 2, wherein the predetermined number of video clock pulses is based upon a register value.

6. The method of claim 2, wherein the predetermined number of video clock pulses is based upon a number of video clock pulses received between pulses of the valid video control signal.

7. The method of claim 2 further comprising:
when the invalid video control signal is received, displaying a predefined image.

8. The method of claim 1, wherein the predetermined number of video clock pulses is based upon a resolution of an image to be displayed.

9. The method of claim 8, wherein the alternate video control signal is provided by the display engine.

10. The method of claim 9, wherein the predetermined number of video clock pulses is stored as a register value.

11. The method of claim 1, wherein the first pulse edge is a vertical synchronization pulse edge.

12. The method of claim 1, wherein the first pulse edge is a horizontal synchronization pulse edge.

13. The method of claim 1, wherein the first pulse edge is a video clock pulse edge.

14. The method of claim 1, wherein determining an invalid video control signal includes determining that an expected video control signal pulse does not occur within the predetermined amount of time.

15. The method of claim 14, wherein the expected time period is based upon an expected number of pulses.

16. The method of claim 15, wherein the expected numbers of pulses are system clock pulses.

17. The method of claim 15, wherein the expected video control signal pulse is a video clock pulse.

18. A system on a chip device comprising:
a video input port to receive external video signals;
a delay module to receive a first plurality of video control signals based upon the external video signals;
a video display engine comprising a port to receive a second plurality of internal video control signals based upon the external video signals;
a valid video detect module coupled to the video input port operable to provide a:
 valid video indicator in response to a transition of the external video signal from a first logic state to a second logic state occurring within a predetermined amount of time and, and to provide;
 an invalid video indicator in response to a transition of the external video signal from the first logic state to the second logic state not occurring within the predetermined amount of time; and
a select module to provide a delayed representation of the first plurality of video control signals as the second plurality of internal video signals in response to receiving a valid video indicator, and to provide a third plurality of internal video control signals as the second plurality of internal control signals in response to receiving an invalid video indicator.

* * * * *